(12) United States Patent
Miles et al.

(10) Patent No.: US 11,303,752 B1
(45) Date of Patent: Apr. 12, 2022

(54) TECHNIQUES FOR MANAGING USER TRANSMISSION RATES IN A COMMUNICATIONS NETWORK

(71) Applicant: Bandwidth, Inc., Raleigh, NC (US)

(72) Inventors: Nathan Miles, Raleigh, NC (US); Nick Ashley, Raleigh, NC (US)

(73) Assignee: Bandwidth Inc., Raleigh, NC (US)

( * ) Notice: Subject to any disclaimer, the term of this patent is extended or adjusted under 35 U.S.C. 154(b) by 0 days.

(21) Appl. No.: 17/487,014

(22) Filed: Sep. 28, 2021

(51) Int. Cl.
*H04M 3/523* (2006.01)
*H04M 3/42* (2006.01)

(52) U.S. Cl.
CPC ....... *H04M 3/5232* (2013.01); *H04M 3/4228* (2013.01); *H04M 3/5237* (2013.01)

(58) Field of Classification Search
None
See application file for complete search history.

(56) References Cited

U.S. PATENT DOCUMENTS

2011/0194684 A1* 8/2011 Ristock ............... H04M 3/5238
379/265.02

2015/0334232 A1* 11/2015 Rist ....................... H04M 3/523
379/265.09

* cited by examiner

*Primary Examiner* — Quynh H Nguyen
(74) *Attorney, Agent, or Firm* — Gregory Stephens

(57) ABSTRACT

Techniques for managing transmission rates for users from each of a plurality of call engines (CEs) distributed on a communications network are provided. A list of users with at least one pending call in a corresponding queue from all other CEs is received, wherein each user's queue has a maximum queue depth calculated, in part, using a capped transmission rate in calls per second (CPS) for each user associated with their queue. It is determined, for each user, a total number of CEs having at least one pending call in their corresponding queue. A current CE transmission rate is calculated for each user by dividing the capped transmission rate for each user by the total number of CEs having at least one pending call in their corresponding queue. The current CE transmission rate indicates a rate at which calls in each user's queue are dequeued at each of the plurality of CEs. When a call request is received at a CE from a specific user, a total number of calls currently queued for the specific user in all CEs is determined. A maximum queue depth for the specific user is also determined, the maximum queue depth indicative of the total number of calls the specific user may queue for a predetermined length of time. The call request will be rejected when the total number of calls currently queued exceeds the maximum queue depth.

9 Claims, 7 Drawing Sheets

200

300

500

600

TECHNIQUES FOR MANAGING USER TRANSMISSION RATES IN A COMMUNICATIONS NETWORK

FIELD

The present inventive concept generally relates to communications networks and, more particularly, to managing users contracted transmission rates and terms of service in communications networks.

BACKGROUND

Telecommunications users (i.e., customers) generally have individualized agreements that dictate a quality of service that the user is due from the telecommunications carrier/provider. Within this agreement, the user's "terms of service" are set out in detail. The terms of service may include, for example, a guaranteed number of calls per second (CPS) that will be sent for that particular user. For example, a user may have contracted for a guaranteed 20 CPS. However, the 20 CPS is a network wide term of service. In other words, the user is guaranteed to send 20 CPS network wide from all data centers/nodes operated by the carrier. The processes for tracking user resource allocation within a communications network across multiple data centers is very difficult and not tracking these resource allocations closely enough may cause the carrier to provide the user with a much higher rate than that which the user is paying. Improved methods of tracking user resource allocations for the whole communications network and providing users with a close proximity to the resources they are paying for are needed.

SUMMARY

Some embodiments of the present inventive concept provide methods for determining transmission rates for users from each of a plurality of peer call engines (CEs) distributed on a communications network. The method includes receiving a list of active users at one of a plurality of peer CEs distributed in the communications network from all remaining ones of the plurality of peer CEs. The list of active users includes a list of users that have at least one pending call in a corresponding unique queue for each user on the list of active users as well as the number of calls each user has on such queues. Each unique queue has a maximum queue depth calculated using a contracted transmission rate for the user associated with the unique queue. For each user, a number of peer CEs of the plurality of peer CEs actively handing traffic by having at least one pending call in the corresponding unique queue for each user is determined based on the list of active users received from all the plurality of peer CEs and a list of active users at the peer CE receiving the lists. A unique transmission rate for each user is calculated by dividing a contracted transmission rate for the user by the determined number of peer CEs actively handling traffic for the user. The unique transmission rate indicates a rate at which calls in a user's unique queue are dequeued at each of the plurality of peer CEs. It is determined if a total number of calls in all of the unique queues for each user at each of the plurality of CEs exceeds the maximum queue depth for each user. Users are notified if it is determined that the total number of calls exceeds the maximum queue depth. The method further comprises periodically repeating the receiving, determining, calculating, determining and notifying to provide an accurate unique transmission rate for each user as traffic in the communication network fluctuates and to allow each user exceeding the maximum queue depth to take remedial action.

Related device and system claims are also provided.

DETAILED DESCRIPTION OF EMBODIMENTS

Figure 1:
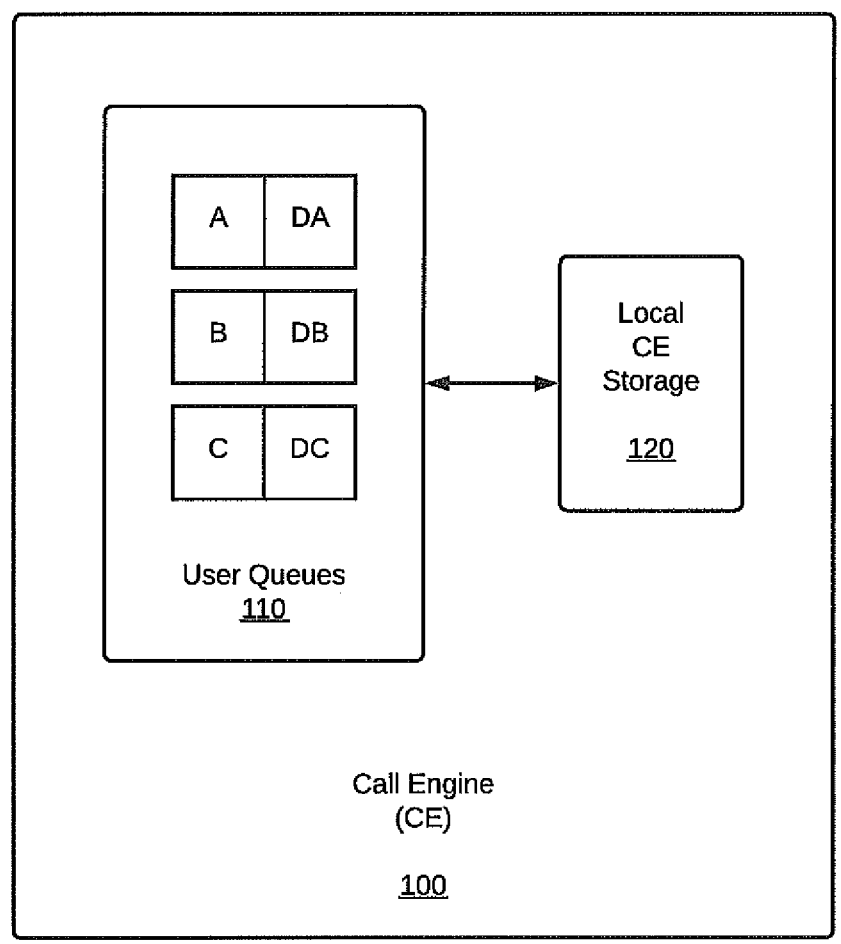
FIG. 1 is a block diagram illustrating a node in accordance with some embodiments of the present inventive concept.

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items. Similarly, as used herein, the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Reference will now be made in detail in various and alternative example embodiments and to the accompanying figures. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

As discussed above, telecommunications users generally have individualized agreements that dictate a quality of service that a user is due from the telecommunications carrier/provider. Within this agreement, the user's "terms of service" are set out in detail. For example, the terms of service may include, for example, a guaranteed transmission rate specified as a number of calls per second (CPS) that will be sent for that particular user. For example, a user may have contracted for a guaranteed 20 CPS. However, the 20 CPS is a network wide term of service. In other words, the user is guaranteed to send 20 CPS network wide from all data centers/nodes operated by the carrier/provider. The processes for tracking user resource allocation within a communications network across multiple data centers is very difficult and not tracking these resource allocations closely enough may cause the carrier to provide the user with a much higher rate than the rate the user is paying for. Improved methods of tracking user resource allocations for the whole communications network and providing users with a close proximity to the resources they are paying for are needed.

One reason that user resource allocation is difficult to track is because each node in the network is sending outbound messages for the same users. For example, there may be four nodes in a network that are all sending traffic for User A. If User A has a contracted CPS of 20 CPS and each node is sending messages from User A at 20 CPS, then user A is essentially getting a transmission rate of 80 CPS network wide and is only paying for the contracted 20 CPS. The lack of communication amongst the various nodes in the communications network makes it very difficult to maintain a network wide transmission for each user. Accordingly, some embodiments of the present inventive concept provide methods for determining a unique transmission rate for each user from each of a plurality of nodes distributed on a communications network at any given point in time. This is accomplished by having all nodes in the network periodically send lists of active users to all the other peer nodes in the communications and this information is used to calculate a unique global transmission rate for each user at any given point in time as will be discussed further herein.

It will be understood that the goal of the present inventive concept is not to achieve a perfectly allocated transmission rate for each user. However, it would benefit the service provider to provide each user with a transmission rate that converges upon their contracted rate. Thus, if a user ends up receiving a few more calls per second than they are contracted for, this would be deemed acceptable. However, if a user receives more than double their contracted rate on average, then the provider clearly needs to address the situation.

As used herein, "transmission rate" refers to a rate at which calls are dequeued, i.e. transmitted from a queue, and is generally relayed in calls per second (CPS). A "contracted transmission rate" refers to a unique rate that each user has contracted with a carrier that defines how many calls per second ("CPS") will be sent for that particular user. "Maximum queue depth" refers to a maximum number of calls that each user can store in a queue or are "queued" for a user network wide. This maximum queue depth is different for each user and is calculated based on the users contracted transmission rate. A "unique (global) transmission rate" refers to a transmission rate calculated for each user at any point in time based on a number of nodes network wide that are actively handling traffic for each user.

As used herein, a "node" refers to a point in a distributed network that receives and processes requests from user. It is assumed that every network includes multiple nodes, otherwise calculating a network wide transmission rate for each user would not be necessary. In some embodiments, the nodes may be call engines (CEs). An example CE 100 is illustrated in FIG. 1. As illustrated, CEs in accordance with embodiments discussed herein maintain a unique queue 110 for each user, for example, users A, B and C. It will be understood that although FIG. 1 only illustrates three users A, B and C, embodiments of the present inventive concept are not limited thereto. Less than two or more than three users may be handled at each CE 100 without departing from the scope of the present inventive concept. As further illustrated in FIG. 1, copies of each of the unique queues 110 for users A, B and C are maintained in local CE storage 120 for backup in case of a network crash other event. As further illustrated in FIG. 1, each node also maintains a queue depth for each user, DA, DB and DC. This information is provided from other nodes in periodic updates. This queue depth information may be used to ensure users are not exceeding a maximum queue depth for that user as will be discussed below.

It will be understood that these nodes (CEs 100) are distributed throughout a communications network. The communications network can be any communications network capable of handling messages and calls in accordance with embodiments of the present inventive concept. Thus, details with respect to specific network elements beyond the node, CEs and details thereof will not be discussed herein in the interest of brevity.

In some embodiments of the present inventive concept users use a Hypertext Transfer Protocol (HTTP) Voice Application Programming Interface (API) to place outbound calls. Users who use this API usually simply want to "fire and forget." In other words, these users want to send calls and have the telecommunication carrier send these calls out to the Public Switched Telephone Network (PSTN) at some point in the near future. These types of calls can be stored in the unique user queues 110 at the CEs 100 and may be dequeued in accordance with the users unique transmission rate in accordance with embodiments discussed herein.

Keeping a user within their contracted terms of service is further complicated by users that send these large amounts of messages with no priority to the carrier. For example, a doctor's office may send 2000 messages to the carrier that include appointment reminders for their patients. The user does not care that the 2000 messages all go out quickly, but they want the messages to be sent eventually. In this situation, the 2000 messages would be placed in queues and sent at the user's agreed upon transmission rate network wide. Thus, for a user who contracted for 20 CPS, the 2000 messages should be sent at 20 CPS network wide until all messages have been sent. Tracking that the user is only receiving their agreed upon rate in these situations is even more complicated than general tracking of resource allocation.

It will be understood that embodiments of the present inventive concept are not limited to dealing with large numbers of messages sent by the user at one time. Methods, devices and systems discussed herein may be used to maintain a user's contracted transmission rate network wide no matter how many calls/messages are sent during a time period.

Figure 2:
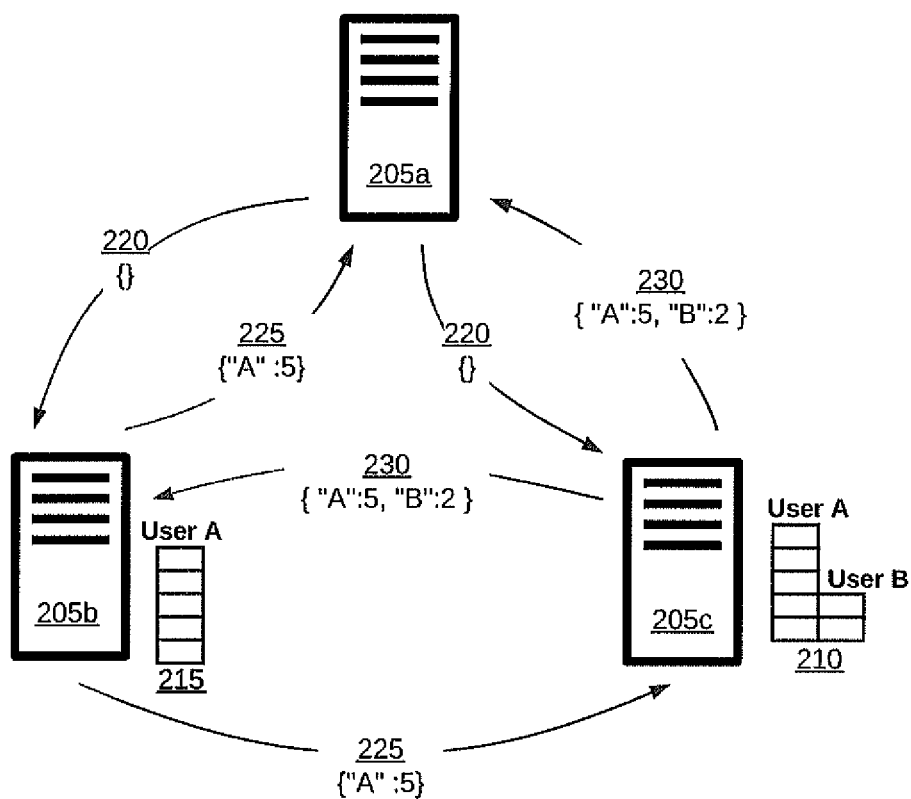
FIG. 2 is a block diagram illustrating a network including nodes in accordance with some embodiments of the present inventive concept.

Referring now to FIG. 2, an example network 200 including nodes 205a, 205b, 205c, for example, CEs 100 illustrated in FIG. 1, that operate in accordance with embodiments discussed herein will be discussed. As illustrated, each node 205a, 205b, 205c includes a unique queue for each user, here users A and B. As indicated by the arrows between the nodes 205a, 205b and 205c, each node periodically sends to every other node in the network a list of active users/users at that node at the time the messages are sent and a queue depth for each user. As used herein, the "list of active users" refers to a list of users that have at least one pending call/message in a queue corresponding to that particular user. In particular, referring to FIG. 2, node 205a sends a null (having 0 active users) list 220 to both nodes 205b and 205c; node 205b sends a list 225 including only user A to both nodes 205a and 205c; and node 205c sends a list 230 including both user A and user B to both nodes 205a and 205b. So, to summarize, User A is "active" at two out of three nodes in the network 200 and User B is active at only one of the three nodes in the network 200. As illustrated in FIG. 2, the nodes 205b and 205c handling active traffic have corresponding queues 215 and 210, respectively, for each user.

As discussed above, embodiments of the present inventive concept calculate a unique global rate for each user network wide based on the number of nodes the user is active in at any point in time. For example, using FIG. 2 as an example, if User A has a contracted rate of 12 CPS, the network 200 cannot send the calls from each node 205a, 205b and 205c at the 12 CPS rate as that would triple User A's contracted rate. Thus, embodiments of the present inventive concept calculate a unique rate for each user at any point in time as follows:

$$\text{Unique global transmission rate for a User} = \text{Contracted CPS for user/Number nodes actively handling traffic for that user} \quad \text{Eqn. (1)}$$

Applying the real numbers from FIG. 2 for User A, User A's unique global transmission rate at this point in time is 12 CPS divided by 2 active nodes in the network 200, which yields 6 CPS. Thus, each of nodes 205b and 205c can send User A's messages at a rate of 6 CPS and maintain User A's contracted rate of 12 CPS network wide.

Similarly, for User B, let's assume a contracted rate of 15 CPS. Applying real numbers from FIG. 2 for User B, User B's unique global transmission rate at this point in time is 15 CPS divided by one active node in the network 200, which yields 15 CPS. Thus, User B has their full contracted rate at node 205c since User B is only active at one node in the network at this point in time.

However, it will be understood, when the next messages are sent to all the nodes in the network and User B is now active at all three nodes, then, the Unique global transmission rate for User B would be 15 CPS divided by 3, which yields 5 CPS per node. Thus, these unique global transmission rates are constantly changing based on each User's current activity at each node.

It will be understood that each of the nodes/CEs 205a, 205b and 205c sends out a list of active users at that CE to all the other CEs periodically, for example, each node may send its list of active users two or more times a second. This time frame is customizable and may depend on the network 200, the users, time of day and the like.

Figure 3:
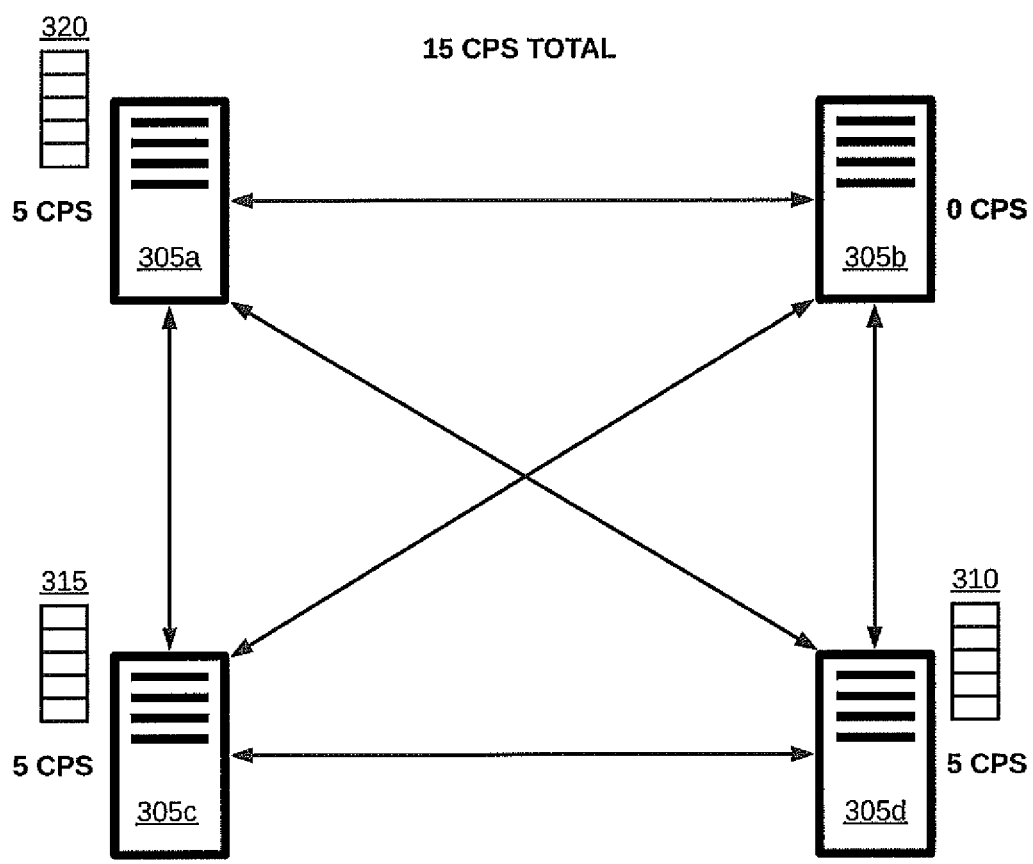
FIG. 3 is a block diagram illustrating nodes including a single user example in accordance with some embodiments of the present inventive concept.

Eqn. (1) set out above is illustrated in FIG. 3. FIG. 3 only illustrates an example for one user. As shown, the user has a contracted rate of 15 CPS. Each of the four nodes/CEs 305a, 305b, 305c and 305d send out their lists of active users at this point in time as indicated by the arrows between the nodes. The user has active traffic at nodes 305a, 305c and 305d as indicated by the queues 320, 315 and 310, respectively, at those nodes. Using Eqn. (1) set out above, the contracted rate of 15 CPS is divided by 3 active nodes to yield a unique global transmission rate of 5 CPS from each of the three active nodes 305a, 305c and 305d.

Referring again to FIG. 2, to summarize, each node 205a, 205b, 205c participating in the network 200 first determines which user's unique queues have pending jobs in them at that node; then sends a list of users for which that node is actively handling traffic to all the other remaining nodes in the network 200 and including a queue depth for each user; receiving the same information from all the other nodes; calculating a unique global transmission rate for each user based on the received information and the active queues at the node itself and processing the messages for the users at the calculated rates. Each node uses the calculated rate until updated information is received from all of the other nodes. The updates may come every, for example, 250 milliseconds (4 times per second) in some embodiments. If an update is not received from one or more nodes in the network after a few update cycles, the last known list from those non-responding nodes may be dropped and will not factor into the calculation of the unique global transmission rate for each user.

As discussed above, some users send large amounts of messages at one time, for example, a user may send thousands of messages related to prescription refills to the CE 100 at one time. As illustrated in FIG. 1, each CE 100 includes a queue 110 for each user. So, some number of messages may be queued at the CE 100 and sent at the user's calculated unique global transmission rate. In other words, the queued messages do not have to send at any specific time, so they are stored and queued and sent within the user's contracted rates network wide. However, the CEs do not have unlimited space to queue an unlimited number of messages. Accordingly, some embodiments of the present inventive concept calculate a maximum queue depth for each user. This maximum queue depth is based on the user's individual contracted transmission rate and dictates the maximum number of calls that can be queued by a user at any given time. The maximum queue depth for a user is calculated based on a five minute window. It will be understood that embodiments of the present inventive concept are not limited to a five minute window. Thus, the maximum queue depth is calculated as follows:

$$\text{Max Queue Depth} = \text{CPS} \times 60 \text{ seconds} \times 5 \text{ minutes} \quad \text{Eqn. (2)}$$

Thus, for the user of FIG. 3 having a contracted rate of 15 CPS, their maximum queue depth would be 15×60×5, which yields 4500 calls. This means that the user in FIG. 3 can queue up to 4500 calls network wide, i.e. 4500 calls distributed throughout all the nodes. Thus, when the nodes provide the periodic lists of active users, these updates include the number of calls queued for each user, i.e. a queue depth for each user is provided by the nodes and is logged at the receiving node as illustrated for example in the CE 100 of FIG. 1.

Accordingly, some embodiments of the present invention calculate a total number of calls queued for each user and determine if this total number of queued calls exceeds the maximum queue depth for that user. If the maximum queue depth has been exceeded, the provider may communicate this information to the user and ask the user not to send any more messages/calls until the queues are emptied. In other words, the user may receive a message indicating that they have exceeded their maximum queue depth and that they need to take remedial action. Imposing these limits on users stops one user (or a small number of users) from overloading the whole system. For example, if a user having a contracted rate of 5 CPS sends 1,000,000,000 calls to be queued at one time, this could overwhelm the network/system. Thus, this user would be limited to a queue size of 5×60×5, which yields a 1500 maximum call queue depth.

Some embodiments allow users to provide a priority flag on a message to indicate that the message is more important than the rest. For example, if a user queues up 2000 appointment reminders and then decides to send a more time sensitive message, the user may mark that message with a priority flag so that this particular message is processed before all the messages already in the queue.

Embodiments of the present inventive concept may provide a smoothing effect on the network by allowing a user's contracted rate to be distributed amongst nodes in the network. If a provider notices that a user is constantly butting up against their contracted rate and/or exceeding the same, the provider may have a conversation with the user about changing the user's terms of service.

As briefly discussed above, each node in the network dequeues calls from each users' unique queue independently from the other nodes. The speed or unique transmission rate at which the unique queue is drained is estimated. Each node will, multiple times per second, tell each other node which users it has calls queued for and how many. Each of the nodes will use this data to estimate how many nodes are currently sending pending calls for each user, and each node will send pending calls at its fraction of the contracted call rate. For example, if a user is provisioned for 15 CPS and they have calls on 3 out of the 4 active call engines (CEs), each node/CE would send pending calls at a rate of 5 calls per second.

Figure 4:
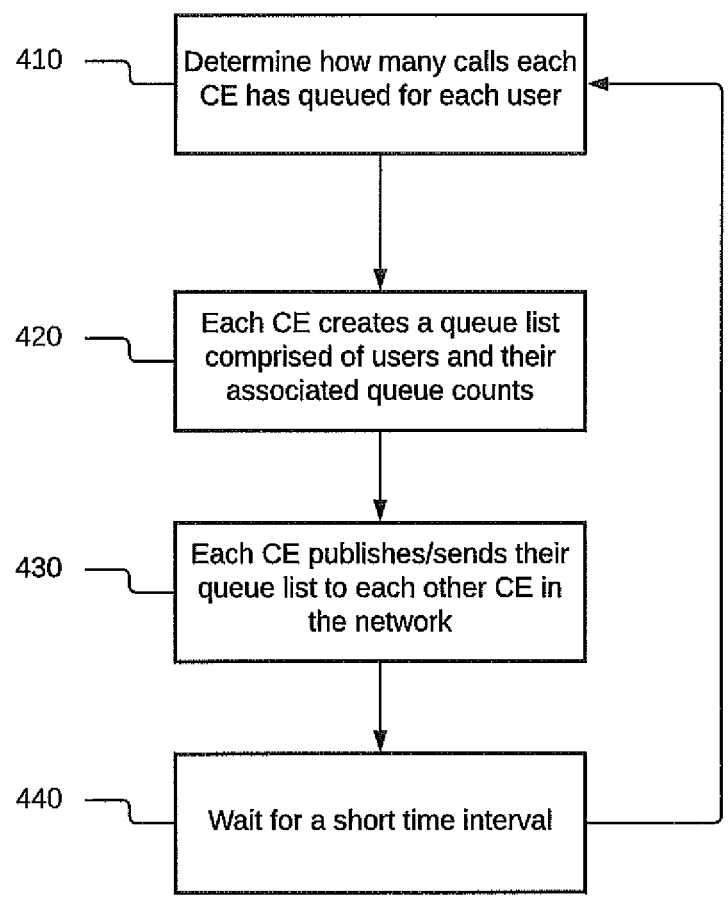
FIG. 4 is a first flowchart illustrating methods for managing transmission rates for users from each of a plurality of peer nodes distributed on a communications network in accordance with some embodiments of the present inventive concept.

Referring now to the flowchart 400 of FIG. 4, certain operations for managing transmission rates for users from each of a plurality of CEs distributed on a communications network will be discussed in accordance with some embodiments of the present inventive concept. As illustrated, operations begin at block 410 by determining how many call requests each CE has queued for each user. As discussed above, each of the CEs in the network periodically sends a list of active users and queue depth information to all other CEs in the network. In some embodiments, the nodes may send this information every 250 ms or four times a second. However, embodiments of the present inventive concept are not limited thereto. As discussed above, the "list of active users" includes a list of users that have at least one pending call/message in a corresponding unique queue for each user and the number of pending calls/messages for such users. The information sent from the CEs may also include the queue depth for each user as the system actively monitors each user's queue depth to ensure that they do not exceed their individually assigned maximum queue depth as defined by Eqn. (2) discussed above.

In particular, each user queue has a "maximum queue depth" calculated using a contracted transmission rate denoted in calls per second (CPS) for that particular user. As illustrated in Eqn. (2), the maximum queue depth for each user queue is calculated by determining a maximum number of calls a user is permitted to make in, for example, five minutes based on the contracted transmission rate for the user.

Operations continue at block 420 by having each CE create a queue list for each user using the information it obtained in step 410. For instance, each CE may create a list of users and the number of calls each user currently has queued on the CE. The user queue list may then be published/sent to each of the other CEs in the network in block 430. Thereafter, each CE may wait, at block 440, a predetermined interval before repeating the steps in blocks 410, 420 and 430. Periodically repeating the steps in blocks 410, 420 and 430 ensures the data remains current and accurate.

Figure 5:
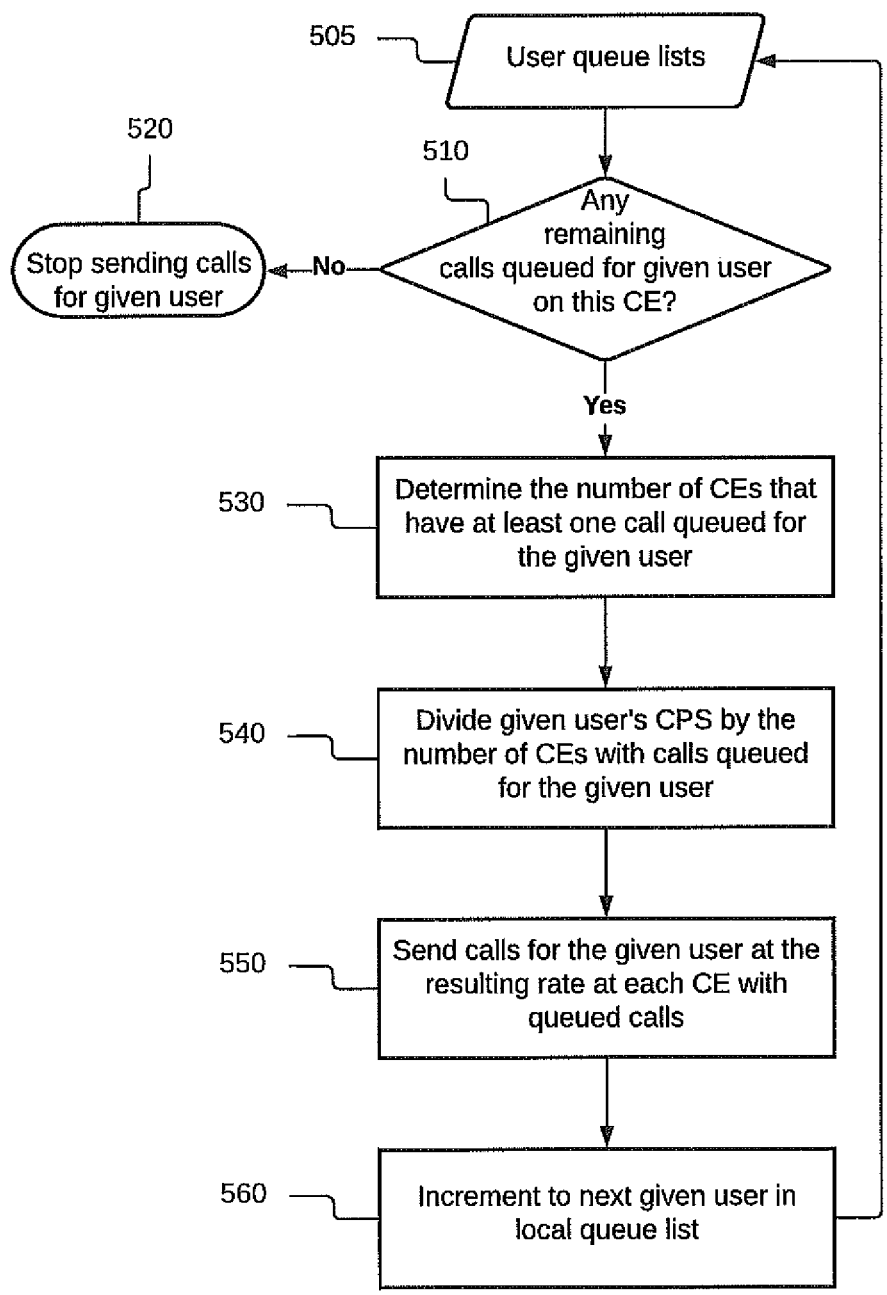
FIG. 5 is a second flowchart illustrating methods for managing transmission rates for users from each of a plurality of peer nodes distributed on a communications network in accordance with some embodiments of the present inventive concept.

Referring now to the flowchart 500 of FIG. 5, certain additional operations for managing transmission rates for users from each of a plurality of CEs distributed on a communications network will be discussed in accordance with some embodiments of the present inventive concept. FIG. 5 describes a given CE within the network of CEs that has received the queue lists from all other CEs and may now use that information to determine whether to continue sending calls for specified users. As illustrated, operations begin at decision block 510 by determining, at the given CE, whether there are any remaining queued calls for a given user using the user queue lists 505. If there are no remaining calls queued for the given user, then all calls for the given user have been dequeued and the given CE will stop sending calls for the given user at block 520.

Otherwise, the given CE, at block 530, may then determine the total number of CEs that have at least one call queued for the given user. The total number of CEs includes the given CE. Operations continue at block 540 by dividing the given user's CPS by the number of CEs with calls queued for the given user to determine a current rate for which each CE should allocate calls for the given user. At block 550, calls are sent for the given user at the given CE at the current rate determined in block 540. Operations continue at block 560 by incrementing to the next given user in the local user queue list (i.e., the given CE's user queue list) and starting the process for that next user at block 510 until all users have been processed.

The current transmission rate is calculated in block 540 described above. This calculation is discussed above with respect to Eqn. (1). As discussed above, the current (global) transmission rate indicates a rate at which calls in a user's queue are dequeued at each of the plurality of CEs.

According to some embodiments of the present inventive concept, dequeuing calls in the queues for each user may be based on a predetermined call priority or a priority flag associated with the message when the message is sent to be queued. For example, some user flows involve placing outbound calls as a part of an existing call flow. Consider an application that receives an inbound call from a user requesting technical support. The application may then play some hold music for the user and in parallel, may place an outbound call to a user service representative. When the representative answers the phone, the application may bridge the calls together. In this scenario, the application very likely wants the outbound call to the user service representative to take priority over any other notification-style calls currently in the queue, since it could take multiple minutes to drain the queue. As discussed above, priority may also be indicated in the message itself, this "flag" may be used to move the message to the front of the queue.

Figure 6:
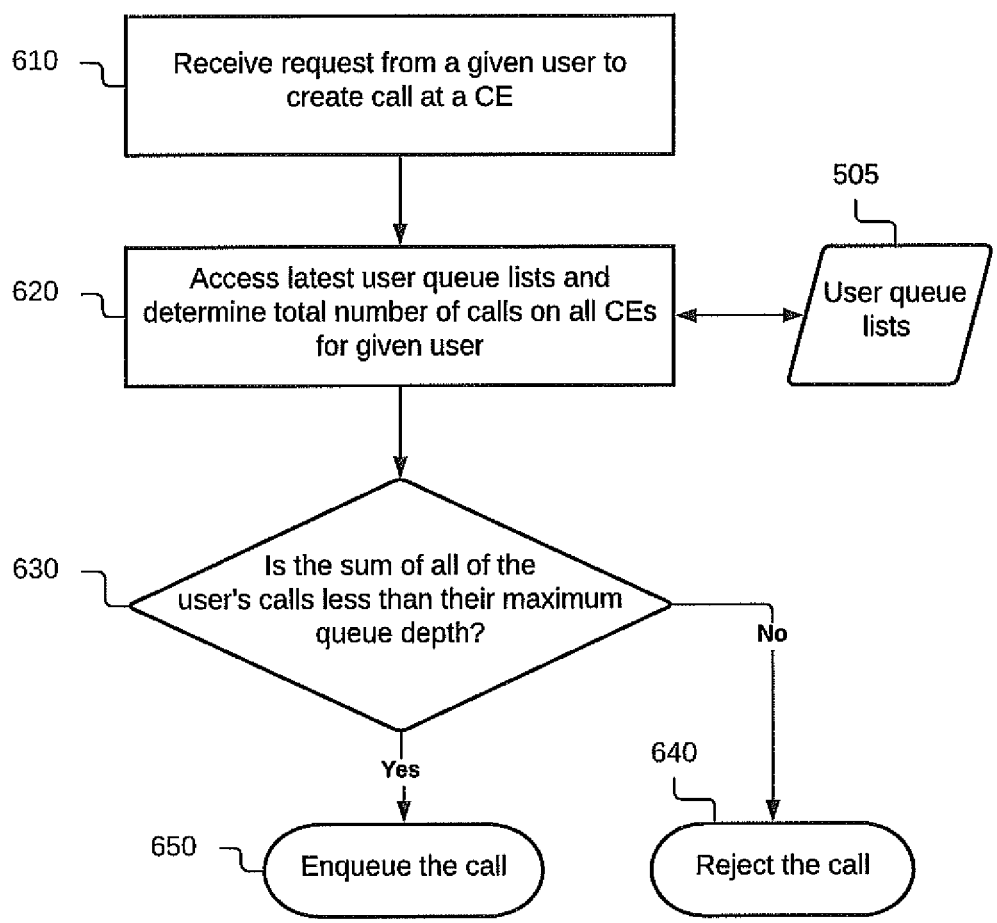
FIG. 6 is a third flowchart illustrating methods for managing transmission rates for users from each of a plurality of peer nodes distributed on a communications network in accordance with some embodiments of the present inventive concept.

Referring now to the flowchart 600 of FIG. 6, certain additional operations for managing transmission rates for users from each of a plurality of CEs distributed on a communications network will be discussed in accordance with some embodiments of the present inventive concept. As illustrated, operations begin at block 610 when a CE receives a request from a given user to create a call. The CE may then access the latest user queue lists 505 to determine the total number of calls across all CEs for the given user at block 620.

Operations continue at decision block 630 when it is determined if the sum of all a given user's calls is less than their maximum queue depth. The maximum queue depth may be calculated by multiplying the user's CPS by a predetermined length of time. In one example, the predetermined length of time may be five (5) minutes or 300 seconds. If the user's CPS is 15, the maximum queue depth for the user would be 15×300=4500 calls. Thus, the user may have up to 4500 calls queued across the network of CEs at any given moment.

If, based on the calculation in decision block 630, the sum of queued calls exceeds the maximum queue depth, the current call request will be rejected in block 640. If the sum of queued calls does not exceed the maximum queue depth, the current call request will be enqueued in block 650. The process of FIG. 6 may be executed for each received call request at each CE. The data contained in the queue lists is constantly being updated as new call requests are made and the CEs dequeue user calls at the determined rates.

Figure 7:
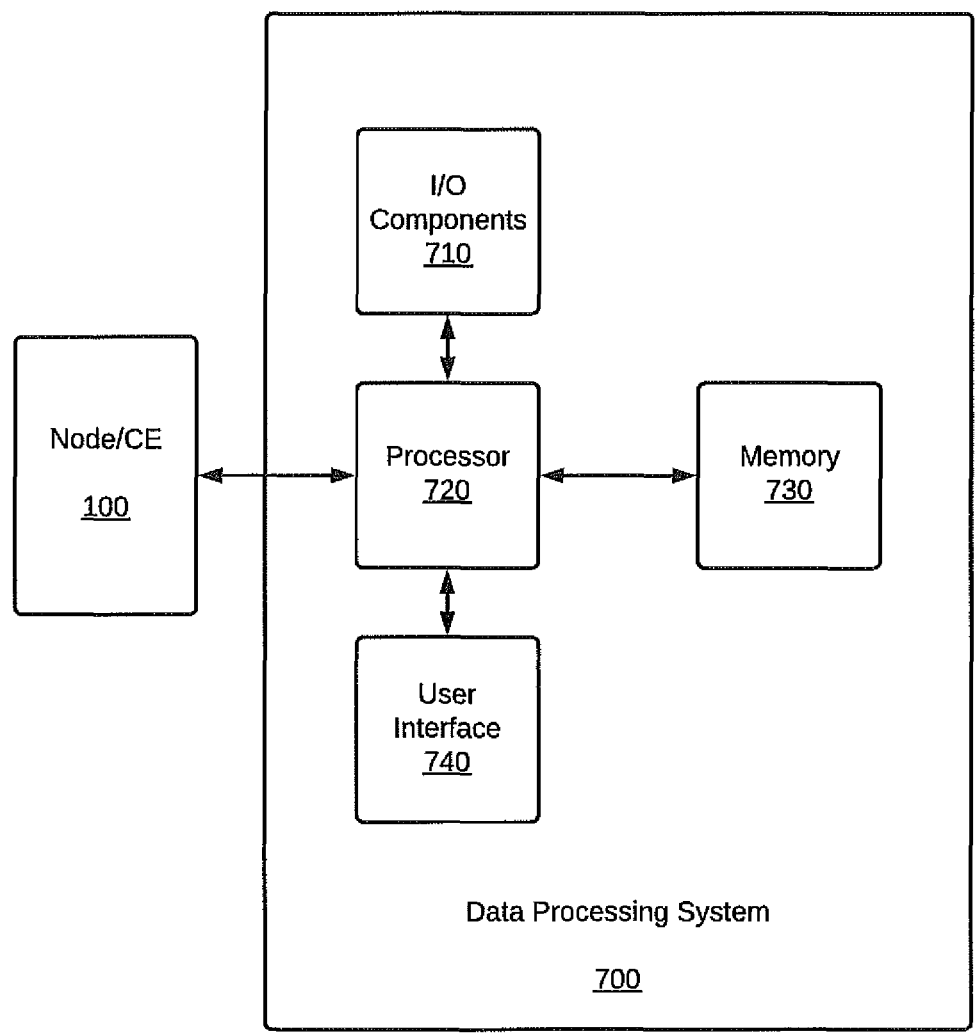
FIG. 7 is a block diagram of a data processing system for use in accordance with some embodiments of the present inventive concept.

Referring now to FIG. 7, an example of a data processing system 700 suitable for use with any of the examples described above. Although the example data processing system 730 is shown as in communication with the node 100 in accordance with embodiments of the present inventive concept, the data processing system 700 may also be part of the node 100 or in any other component of the system 700 without departing from the scope of the present inventive concept. In some examples, the data processing system 700 can be any suitable computing device for performing operations according to the embodiments discussed herein described herein.

As illustrated, the data processing system 700 includes a processor 720 communicatively coupled to I/O components 710, a user interface 740 and a memory 730. The processor 720 can include one or more commercially available processors, embedded processors, secure processors, microprocessors, dual microprocessors, multi-core processors, other multi-processor architectures, another suitable processing device, or any combination of these. The memory 730, which can be any suitable tangible (and non-transitory) computer-readable medium such as random-access memory (RAM), read-only memory (ROM), erasable and electronically programmable read-only memory (EEPROMs), or the like, embodies program components that configure operation of the data processing system 700.

I/O components 710 may be used to facilitate wired or wireless connections to devices such as one or more displays, game controllers, keyboards, mice, joysticks, cameras, buttons, speakers, microphones and/or other hardware used to input or output data. Memory 730 represents non-volatile storages such as magnetic, optical, or other storage media included in the data processing system and/or coupled to processor 720.

The user interface 740 may include, for example, a keyboard, keypad, touchpad, voice activation circuit, display or the like and the processor 720 may execute program code or instructions stored in memory 730.

It should be appreciated that data processing system 700 may also include additional processors, additional storage, and a computer-readable medium (not shown). The processor(s) 720 may execute additional computer-executable program instructions stored in memory 730. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

As discussed briefly above, some embodiments of the present inventive concept provide a distributed system of independent nodes that process jobs at a globally constant rate that differs for each user. For example, if a user is configured for 12 jobs per second and there are two nodes processing their jobs, they should each process that user's jobs at a rate of 6 jobs per second and so on. At any point in time, any node may have out of date information about another node's status, but that will be corrected as soon as the other node pushes its next update. The system may over or underestimate a user's current target rate, but overall, the rate coverages to the contracted rate, which is the goal.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

That which is claimed is:

1. A method for managing transmission rates for users of a plurality of call engines (CEs) distributed in a communications network, the method comprising, at each CE of the plurality of CEs distributed in the communications network:

receiving a list of users with at least one pending call or message in a corresponding queue from all other CEs, wherein each user's queue has a maximum queue depth calculated, in part, using a capped transmission rate in calls per second (CPS) or messages per second (MPS) for each user associated with their queue;

determining, for each user, a total number of CEs having at least one pending call or message in their corresponding queue;

calculating a current CE transmission rate for each user by dividing the capped transmission rate for each user by the total number of CEs having at least one pending call or message in their corresponding queue, the current CE transmission rate indicating a rate at which calls or messages in each user's queue are dequeued at each of the plurality of CEs currently handling calls or messages;

periodically repeating the receiving, determining, and calculating, to provide a current CE transmission rate for calls and messages for each user;

receiving a call or message request at a CE via an application programming interface (API), the request emanating from a telecommunication device of a specific user;

determining a total number of calls or messages currently queued for the specific user in all CEs;

determining the maximum queue depth for the specific user, the maximum queue depth indicative of the total number of calls or messages the specific user may queue over a predetermined length of time; and rejecting the call or message request when the total number of calls or messages currently queued exceeds the maximum queue depth.

2. The method of claim 1, the maximum queue depth equal to the capped transmission rate multiplied by the predetermined length of time.

3. The method of claim 2, further comprising dequeuing calls or messages in the queue for each user based on a predetermined call or message priority.

4. A call engine (CE) device for managing transmission rates for users of a plurality of call engines (CEs) distributed in a communications network, comprising:

at least one non-transitory storage module; and at least one processor, communicatively coupled to the at least one storage module, the at least one processor being configured to:

receive a list of users with at least one pending call or message in a corresponding queue from all other CEs, wherein each user's queue has a maximum queue depth calculated, in part, using a capped transmission rate in calls per second (CPS) or messages per second (MPS) for each user associated with theft queue;

determine, for each user, a total number of CEs having at least one pending call or message in their corresponding queue;

calculate a current CE transmission rate for each user by dividing the capped transmission rate for each user by the total number of CEs having at least one pending call or message in their corresponding queue, the current CE transmission rate indicating a rate at which calls or messages in each users queue are dequeued at each of the plurality of CEs currently handling calls or messages;

periodically repeat the receiving, determining, and calculating, to provide a current CE transmission rate for calls and messages for each user;

receive a call or message request at a CE via an application programming interface (API), the request emanating from a telecommunication device of a specific user;

determine a total number of calls or messages currently queued for the specific user in all CEs;

determine the maximum queue depth for the specific user, the maximum queue depth indicative of the total number of calls or messages the specific user may queue over a predetermined length of time; and reject the call or message request when the total number of calls or messages currently queued exceeds the maximum queue depth.

5. The call engine device of claim 4, the maximum queue depth equal to the capped transmission rate multiplied by the predetermined length of time.

6. The call engine device of claim 5, wherein the processor is further configured to dequeue calls or messages in the queue for each user based on a predetermined call or message priority.

7. A system for managing transmission rates for users, the system comprising:
a communication network;
a plurality of call engines (CEs) distributed on the communications network, each call engine device comprising:
at least one non-transitory storage module; and
at least one processor, communicatively coupled to the at least one non-transitory storage module, the at least one processor being configured to:
receive a list of users with at least one pending call or message in a corresponding queue from all other CEs, wherein each user's queue has a maximum queue depth calculated, in part, using a capped transmission rate in calls per second (CPS) or messages per second (MPS) for each user associated with theft queue;
determine, for each user, a total number of CEs having at least one pending call or message in theft corresponding queue;
calculate a current CE transmission rate for each user by dividing the capped transmission rate for each user by the total number of CEs having at least one pending call or message in their corresponding queue, the current CE transmission rate indicating a rate at which calls or messages in each user's queue are dequeued at each of the plurality of CEs currently handling calls or messages;
periodically repeat the receiving, determining, and calculating, to provide a current CE transmission rate for calls and messages for each user;
receive a call or message request at a CE via an application programming interface (API), the request emanating from a telecommunication device of a specific user;
determine a total number of calls or messages currently queued for the specific user in all CEs;
determine the maximum queue depth for the specific user, the maximum queue depth indicative of the total number of calls or messages the specific user may queue over a predetermined length of time; and
reject the call or message request when the total number of calls or messages currently queued exceeds the maximum queue depth.

8. The system of claim 7, the maximum queue depth equal to the capped transmission rate multiplied by the predetermined length of time.

9. The system of claim 8, wherein the processor is further configured to dequeue calls or messages in the queue for each user based on a predetermined call or message priority.

* * * * *